United States Patent
Cervelli et al.

(10) Patent No.: US 9,396,410 B1
(45) Date of Patent: Jul. 19, 2016

(54) PRESERVING ANGLES OF GRAPH ELBOWS

(75) Inventors: Daniel P. Cervelli, Mountain View, CA (US); Carl Freeland, Palo Alto, CA (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 555 days.

(21) Appl. No.: 13/247,987

(22) Filed: Sep. 28, 2011

(51) Int. Cl.
*G09G 5/00* (2006.01)
*G06K 9/62* (2006.01)

(52) U.S. Cl.
CPC .................................. *G06K 9/6211* (2013.01)

(58) Field of Classification Search
CPC .......... G06F 17/3092; G06F 17/30554; G06F 17/30392
See application file for complete search history.

(56) References Cited

U.S. PATENT DOCUMENTS

| | | | | |
|---|---|---|---|---|
| 5,798,769 | A * | 8/1998 | Chiu et al. | 345/442 |
| 6,674,434 | B1 * | 1/2004 | Chojnacki et al. | 345/428 |
| 2005/0078858 | A1 * | 4/2005 | Yao | G06K 9/00201 382/128 |
| 2006/0209085 | A1 * | 9/2006 | Wong et al. | 345/629 |
| 2011/0131547 | A1 * | 6/2011 | Elaasar | 717/105 |
| 2011/0185316 | A1 * | 7/2011 | Reid et al. | 715/863 |
| 2012/0050293 | A1 * | 3/2012 | Carlhian et al. | 345/442 |

OTHER PUBLICATIONS

"About connecting shapes" 2011 Microsoft Corporation, downloaded from the Internet on Aug. 4, 2011 < http://office.microsoft.com/en-us/visio-help/about-connecting-shapes-HP085050369.aspx > (6 pages).

"Add and glue connectors with the Connector tool" 2011 Microsoft Corporation, downloaded from the Internet on Aug. 4, 2011 http://office.microsoft.com/en-us/visio-help/add-and-glue-conenctors-with . . . > (1 page).

* cited by examiner

*Primary Examiner* — Sultana M Zalalee
(74) *Attorney, Agent, or Firm* — Hickman Palermo Becker Bingham LLP

(57) ABSTRACT

Techniques are provided for preserving angles at graph elbows as graph nodes are moved. A graph, which includes a first segment and a second segment that form an acute or obtuse angle at a vertex, is displayed. The first segment has a first end opposite the vertex at a first position; the second segment has a second end opposite the vertex at a second position. User input moves the second end from the second position to a third position. In response, the angle is automatically preserved by modifying a length of the first segment and a length of the second segment, without modifying the first position of the first end. Other techniques can replace two segments with a single segment if one of the segments becomes too short, or snap an elbow angle to a specified angle if moving the node causes the elbow angle to near the specified angle.

14 Claims, 17 Drawing Sheets

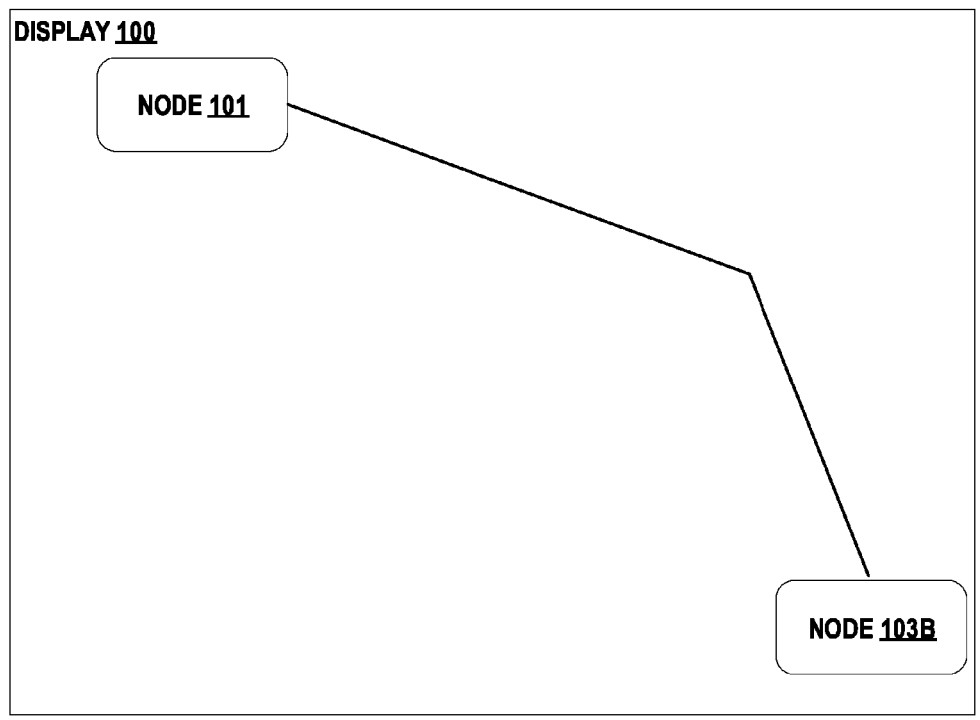

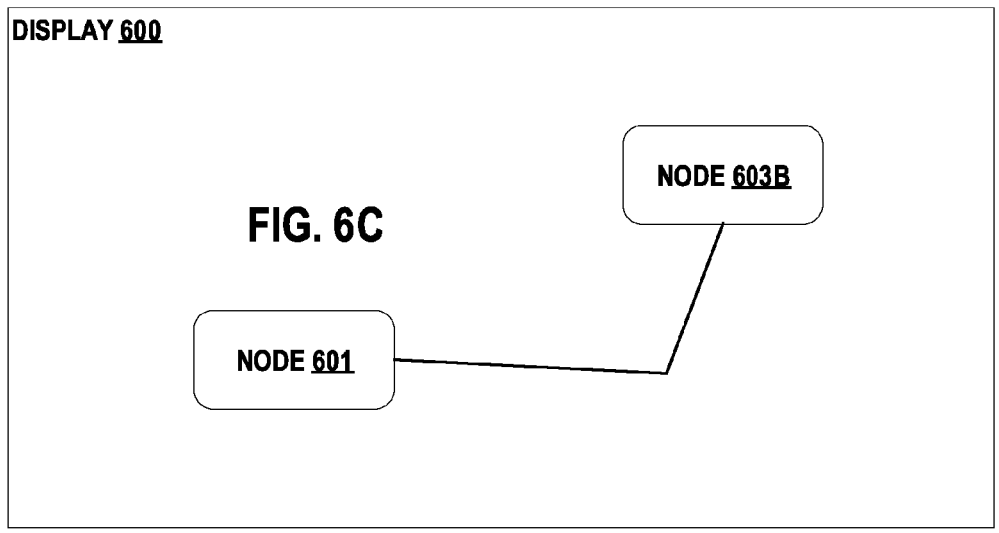

PRESERVING ANGLES OF GRAPH ELBOWS

TECHNICAL FIELD

The disclosure is related to displaying graphs and re-displaying graph elbows as graph nodes are moved in graphical computer displays.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright © 2011 Palantir Technologies, Inc.

BACKGROUND

Graphs in graphical computer displays may visually represent objects or data items and relationships between the objects or data items. Graph nodes typically represent the objects or data items, and connections between the graph nodes typically represent relationships between the objects or data items. For example, if graph nodes represent people, a connection between two nodes may represent a history of communication between two people. In another example, if graph nodes represent items of Extensible Markup Language ("XML") data, a connection between two nodes may indicate that one of the data items is nested within the other data item.

Relationships between graph nodes may be directional or non-directional. Directional relationships are often indicated with an arrow along or at the end of a connection. If the graph nodes represent people, for example, an arrow pointing from a first node to a second node may indicate that the first node represents a first person who called or contacted a second person represented by the second node. If the graph nodes represent items of XML data, for example, an arrow pointing from a first node to a second node may indicate that the first node represents a parent item that contains a child item represented by the second node. Various types of relationships may be characterized as directional, depending on the implementation.

Graph nodes may be visually arranged in different levels of a graph node hierarchy. If graph nodes are organized into a hierarchy, a viewer of the graph may be able to more quickly, more easily, and more fully understand where a given object fits within a dataset and how that object relates to other objects in the dataset.

On complex graphs, depicting a straight segment between two nodes may be visually unappealing and even confusing. When the straight segment between two nodes is unappealing to a user, the user may break up the connection between the two nodes into segments or arcs that are joined at elbows or vertices. For example, two segments may be joined by an elbow to form a right angle. Similarly, a graphing application may recognize that a straight-line connection would overlap onto other graph nodes or connections. In order to avoid the overlap, the graphing application may break up the connection into segments joined at elbows.

As graphs become more complex, creating and re-arranging the graphs can be cumbersome. A complex graph may be substantially re-arranged by the user when a node is inserted into the graph or when new arrangements of the graph are discovered. Moving nodes may destroy existing connections between the nodes or render the existing connections visually unappealing or overlapping onto other nodes or connections.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 1C illustrates the example graph of FIG. 1A with the proposed new connection computed in FIG. 1B after the node has been dragged to the other position.

FIG. 6C illustrates the example graph of FIG. 6A with the proposed new connection computed in FIG. 6B after the node has been dragged to the other position.

DETAILED DESCRIPTION

Figure 1A:
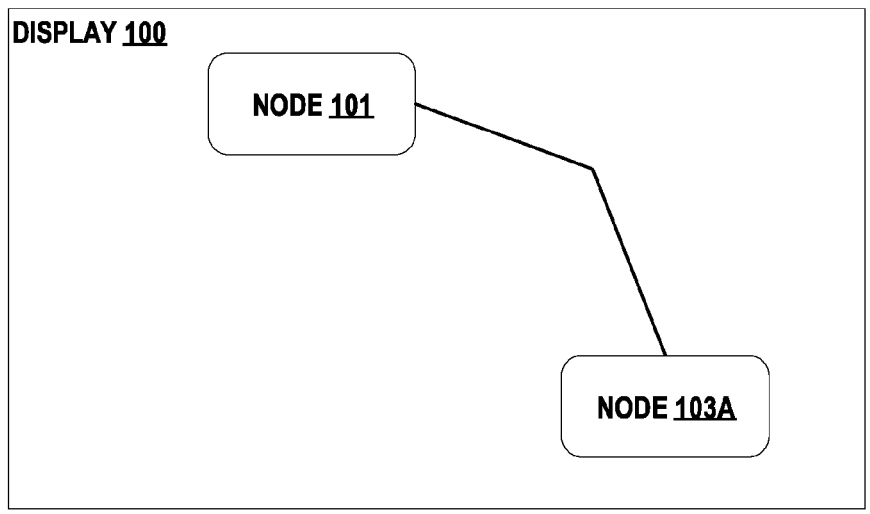
FIG. 1A illustrates an example graph that includes an initial connection having two segments that meet at an elbow to form an obtuse angle.

Preserving angles at graph elbows as graph nodes are moved, on graphical computer displays, is disclosed. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are disclosed for preserving angles at graph elbows as graph nodes are moved on graphical computer displays. In one embodiment, a graph management device causes a graph to be displayed to a user. The graph includes a first segment and a second segment that form an acute or obtuse angle at a vertex. The first segment has a first end opposite the vertex at a first position on the graph, and the second segment has a second end opposite the vertex at a second position on the graph. In a particular embodiment, the graph management device causes a first graphical element, representing a first graph node, to be displayed at the first end, and a second graphical element, representing a second graph node, to be displayed at the second end. The graph management device receives input that moves the second end from the second position to a third position on the graph. In response to the input, the graph management device automatically preserves the acute or obtuse angle by modifying a length of the first segment and a length of the second segment, without modifying the first position of the first end.

In one embodiment, the input comprises a selection, by the user, of the second end at the second position, a dragging of the second end to the third position, and a de-selection of the second end at the third position. In a particular embodiment, the graph management device automatically preserves the angle in response to the de-selection of the second end at the third position. In a further embodiment, the graph management device causes display of a proposed position of the second end as the second end is dragged from the second position to the third position. As the second end is dragged, the proposed position may be between or otherwise different from the second position and the third position.

In one embodiment, in response to the user input, the graph management device modifies the first segment by mirroring the first segment over a vertical axis. For example, the third position may be on an opposite vertical side of the first graphical element than the second position. In a further embodiment, the graph management device automatically preserves the angle by swapping an interior angle formed by the first position, the vertex, and the second position, before the move, for an exterior angle formed by the first position, the vertex, and the third position, after the move.

In an alternate embodiment, in response to the user input, the graph management device modifies the second segment by mirroring the second segment over a horizontal axis. For example, the third position may be on an opposite lateral side of the first graphical element than the second position. In a further embodiment, the graph management device automatically preserves the angle by swapping an interior angle formed by the first position, the vertex, and the second position, before the move, for an exterior angle formed by the first position, the vertex, and the third position, after the move.

According to one embodiment, the graph management device causes display, at the first end, of a first graphical element that represents a first object that is described by several data items. The graph management device causes display, at the second end, of a second graphical element that represents a second object that is described by several data items. The first segment and the second segment form a connection between the first graphical element and the second graphical element. The connection between the graphical elements represents a relationship between the objects. The user may select and move the second graphical element from the second position to the third position, triggering the graph management device to preserve the angle by modifying a length of the first segment and a length of the second segment, without modifying the first position of the first end.

Techniques are also disclosed for replacing an elbowed connection with a straight connection if a graph node is moved to a position near the elbow. In one embodiment, the graph management device causes display of a graph. The graph includes a first segment and a second segment that form an angle at a vertex. The first segment has a first end opposite the vertex at a first position on the graph, and the second segment has a second end opposite the vertex at a second position on the graph. In a particular embodiment, the graph management device causes a first graphical element, representing a first graph node, to be displayed at the first end, and a second graphical element, representing a second graph node, to be displayed at the second end. The graph management device receives input from a user that moves the second end from the second position to a third position on the graph. In response to the input, graph management device automatically determines whether the third position is within a threshold distance of the vertex and, if so, automatically replaces the first segment and the second segment with a third segment between the first position and the third position.

In one embodiment, the graph management device automatically determines whether the third position is within the threshold distance of the vertex by determining a proposed position of the vertex, and determining whether the third position is within the threshold distance of the proposed position of the vertex. The proposed position of the vertex is determined by preserving the angle when the end of the second segment is moved from the second position to the third position. The graph management device may automatically preserve the angle by modifying a length of the first segment and a length of the second segment, without modifying the first position of the first end. In a further embodiment, the angle is either acute or obtuse rather than being a straight line or right angle.

In one embodiment, the user input comprises a selection of the second end at the second position, a dragging of the second end to the third position, and a de-selection of the second end at the third position. In a particular embodiment, in response to the de-selection of the second end at the third position, the graph management device automatically either replaces the first segment and the second segment with the third segment or preserves the angle. In a further embodiment, the graph management device causes display of a proposed position of the second end as the second end is dragged from the second position to the third position. As the second end is dragged, the proposed position may be between or otherwise different from the second position and the third position.

Techniques are also disclosed for snapping angles at graph elbows to particular angles as graph nodes are moved. In one embodiment, a graph management device causes display of a graph. The graph includes a first segment and a second segment that form a first angle at a vertex. The first segment comprises a first end opposite the vertex at a first position on the graph, and the second segment comprises a second end opposite the vertex at a second position on the graph. In a particular embodiment, the graph management device causes a first graphical element, representing a first graph node, to be displayed at the first end, and a second graphical element, representing a second graph node, to be displayed at the second end. The graph management device receives input that moves the second end from the second position to a third position on the graph. A second angle is formed by the third position, the vertex, and the first position, and the second angle does not match a particular angle. In response to the input, the graph management device automatically determines whether the second angle is within a threshold distance of the particular angle and, if so, automatically snaps the second angle to the particular angle.

In one embodiment, the particular angle is 180 degrees. In one example, the graph management device automatically snaps the second angle to the particular angle by automatically replacing the first segment and the second segment with a third segment between the first position and the third position. In another example, the graph management device automatically snaps the second angle to the particular angle by automatically modifying the third position by rotating the second segment about the vertex until the second angle is 180 degrees.

In another embodiment, the particular angle is any one of 15 degrees, 30 degrees, 45 degrees, 60 degrees, 75 degrees, 90 degrees, 105 degrees, 120 degrees, 135 degrees, 150 degrees, 165 degrees, or 180 degrees. The graph management device automatically snaps the second angle to the particular angle by automatically modifying the third position by rotating the second segment about the vertex until the second angle matches the particular angle. The particular angle may also be defined in increments greater or less than 15 degrees or by discrete values other than the ones listed.

In one embodiment, the graph management device automatically preserves the first angle formed by the first segment and the second segment if the second angle is not within the threshold distance of the particular angle. The graph management device may automatically preserve the first angle by modifying a length of the first segment and a length of the second segment, without modifying the first position of the first end. In a further embodiment, the angle is either acute or obtuse rather than being a straight line or right angle.

In one embodiment, the user input includes a selection of the second end at the second position, a dragging of the second end to the third position, and a de-selection of the second end at the third position. In a particular embodiment, in response to the de-selection of the second end at the third position, the graph management device automatically snaps the second angle to the particular angle. In a further embodiment, the graph management device causes display of a proposed position of the second end as the second end is dragged from the second position to the third position. As the second end is dragged, the proposed position may be between or otherwise different from the second position and the third position.

The techniques described herein may be implemented as a process or method performed by one or more computing devices such as a graph management device. The techniques may also be implemented as an article of manufacture, such as one or more non-transitory computer-readable media, that causes the process to be performed by one or more computing devices. For example, execution of instructions stored on the computer-readable media may cause the one or more computing devices to operate as a graph management device. In a particular example, the computer-readable media may cause a graph management application to be installed and become operational on the one or more computing devices.

Additionally, the techniques may be implemented as a machine that is specially configured to perform the process. For example, the machine may be a general purpose computer that is specially configured to perform the process, a cloud computing system that includes multiple computing devices that are specially configured to operate together to perform the process, a mobile device that is specially configured to perform the process, or any other combination of these computing devices or other computing devices that are specially configured to perform the process. In a particular example, the machine is specially configured by installation of a graph management application that causes the machine to operate as a graph management device.

Moving Nodes, Elbows, or Segments

An example graphing computer program application allows users to add graph nodes, elbows, and segments to a graph; move graph nodes, elbows, and segments to desired positions on the graph; and remove graph nodes, elbows, and segments from the graph. The graph nodes, elbows, and segments, along with potentially other graph elements, make up the graph. A segment has two endpoints. Segments may be displayed as an arc, a squiggle, a line segment, or some other connection mechanism between the two endpoints. An elbow is a shared end of two segments. More generally, a graph node is an end of a segment.

In one embodiment, a graph node includes a graphical element that is displayed at the end of a segment. In a particular embodiment, the graphical element is associated with an object of data that is described by one or more data items. For example, the graphical element may be an icon or a profile image that represents a person. The icon or profile image may be unique to the person represented by the node, or generic with respect to all persons or with respect to only certain types of people, based on gender or other individual characteristics.

A user may select a graph element by clicking on, touching, or providing other user input that selects the graph element. While the element is selected, the element may be moved from one location or region on the graph to another location or region. For example, the element may be moved vertically higher or lower, or laterally to the left or right. As a graph element moves on the graph, other connected graph elements may move, stretch, or shrink to account for a changing position of the graph element. For example, as a graph node is moved on the graph, a segment connected to the graph node may stretch, shrink, or otherwise move to account for the changing position of the node.

In one embodiment, an end of the segment opposite the moved end remains locked as the node is moved on the graph. In another embodiment, the opposite end of the segment is an elbow that moves as the node is moved on the graph. For example, the elbow may be moved such that the angle formed by the segment, the elbow, and another segment is preserved as the node is moved from a first position on the graph to a second position on the graph.

In one embodiment, the graph includes a first segment that ends with a first node and an elbow, and another segment that ends with the elbow and a second node. As the second node is moved from one position to another position on the graph, the position of the first node of may remain locked. The positions of the elbow and second node may be modified to preserve the angle formed by the first segment, the elbow, and the second segment as user input moves the second node on the graph. In one embodiment, the first segment remains along the same line before and after the second node is moved. In this embodiment, the direction of the first segment may remain the same or be reversed, depending on where the second node is moved by the user input.

In one embodiment, the second node is connected to the first node by a connection that includes an elbow, and the first node is a non-elbow node. In another embodiment, the first node is another elbow along a connection between the first node and a non-elbow node. The first node may or may not be locked as the second node is moved on the graph. In one embodiment, unselected objects are locked by default, and unselected elbows are unlocked by default. A locked graph element remains fixed when the element is not selected but is moveable when the item is selected. An unlocked graph element may move to accommodate user input that moves another graph element even when the unlocked element is not selected. For example, unlocked graph elements may move to preserve positions of elbows or objects, to preserve angles formed by segments at elbows, to preserve lengths of segments, or to preserve directions of segments. In a particular example, two objects (a first object and a second object) may be connected on the graph with any number of segments and elbows. As the first object is selected and moved, the segments and elbows between the two objects may also be moved even if the segments and elbows have not been selected. If the second object is locked, the position of the second object remains unchanged if the second object has not been selected.

In various implementations, different combinations of elbow positions, object positions, segment positions, segment directions, and/or angles formed by segments are locked and/or unlocked by default. In one embodiment, one end of a segment may be locked even though the other end of the segment is unlocked. Modification of the unlocked end may result in changing the length of the segment and/or the direction of the segment. In one embodiment, the direction of an unselected segment is locked even though the length of the segment is unlocked. In another embodiment, the length of an unselected segment is locked even though the direction of the segment is unlocked. In one example, different default locking characteristics are specified for graph elements of different types. For example, an unselected object of a first type may be locked by default, and an unselected object of a second type may be unlocked by default.

The locking characteristics for different elbows, objects, segments, and angles may be modified by user input. In one example, a user may prefer to lock elbows as objects are moved on a graph. In another example, a user may prefer to lock or preserve angles formed at unselected elbows as objects are moved on a graph. In one embodiment, if a move cannot satisfy all of the locking characteristics for the graph, the move is performed while satisfying a subset of the locking characteristics for the graph. For example, the graph management device may determine which locking characteristics should apply for a given move by giving priority to certain locking characteristics or other graph updating rules. In another embodiment, a move may be disallowed if the move cannot be performed without satisfying all of the locking characteristics for the graph.

Preserving Angles

In one embodiment, one or more angles formed at one or more unselected elbows are preserved as a graph node is moved from a first position to a second position. For example, an angle formed at a vertex of a first segment and a second segment may be preserved when an end of the second segment, opposite the vertex, is moved from a first position to a second position. The angle may be preserved by moving the vertex, moving and/or stretching or shrinking the first segment, and/or moving and/or stretching or shrinking the second segment. In one embodiment, the first segment remains along the same line before and after the move, and an end of the first segment, opposite the vertex, is locked during the move. In this embodiment, the first segment may be in the same direction or an opposite direction after the move. The first and second segments may be stretched or shrunk, the vertex may be moved, and the second segment may be moved laterally and/or vertically in order to preserve the angle and account for the changing position of the end of the second segment.

In another embodiment, the first segment does not remain along the same line before and after the move, and the end of the first segment, opposite the vertex, is not locked. In one example, the end of the first segment, opposite the vertex, moves to account for the changing position of the end of the second segment. In another example, the direction of the first segment changes to account for the changing position of the end of the second segment.

Figure 1B:
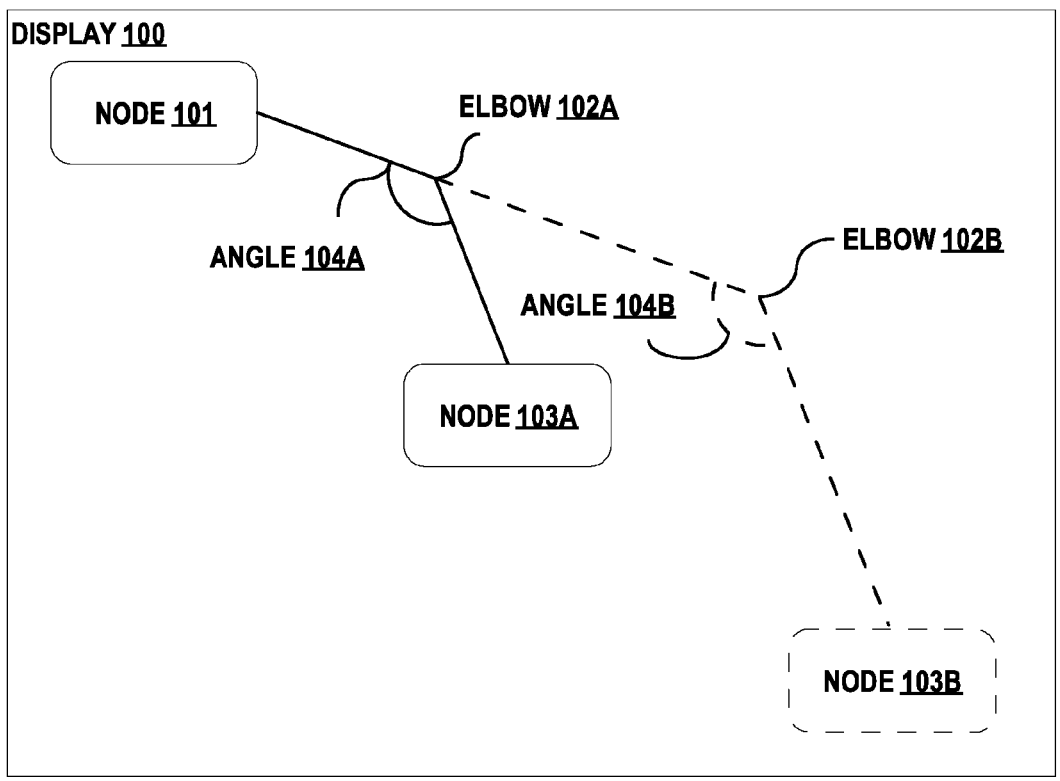
FIG. 1B illustrates an example computation that is performed on the example graph of FIG. 1A to form a proposed new connection, having the same angle as the initial connection, when a node is dragged from one position to another position.

In one embodiment, illustrated in FIG. 1A, 1B, 1C, a node is moved from a first position to a second position while preserving the angle formed at a connected elbow. FIG. 1A illustrates an example graph that includes an initial connection having two segments that meet at an elbow to form an obtuse angle. The initial connection connects node 101 and node 103A. In the example, node 103A is dragged from a first position to a second position indicated as node 103B in FIG. 1B. In one embodiment, as a node is dragged from one position to another, a proposed position of the node and a proposed new connection may be displayed to the user on display 100. In another embodiment, the dragged node is displayed, but the proposed new connection is not displayed until the node position has been finalized. For example, the proposed new connection may be hidden or made semi-transparent until the moved node has been de-selected or dropped by the user onto the second position.

FIG. 1B illustrates an example computation that is performed on the example graph of FIG. 1A to form the proposed new connection, having the same angle as the initial connection, when a node is dragged from one position to another position. FIG. 1B is provided to illustrate the transition from FIG. 1A and FIG. 1C. In one embodiment, the complexities of the computations shown in FIG. 1B are hidden from the user and are not shown on display 100. Before node 103A is moved to node 103B, node 101, elbow 102A, and node 103A form angle 104A. After node 103A is moved to node 103B, node 101, proposed new elbow 102B, and proposed new node 103B form angle 104B, which is congruent to angle 104A. As shown, the segment spanning from node 101 to elbow 102A has been stretched to a segment spanning from node 101 to elbow 102B. Also, the position of elbow 102A has been modified both vertically and laterally to a new position of proposed elbow 102B. In the example, the segment spanning from elbow 102A to node 103A was also stretched to form a segment spanning from elbow 102B to node 103B.

FIG. 1C illustrates the example graph of FIG. 1A with the proposed new connection computed in FIG. 1B after the node has been dragged to the second position. As shown, after node 103A has been moved to node 103B, the connection between node 101 and node 103B has a same angle as the connection between node 101 and node 103A, illustrated in FIG. 1A.

Figure 4A:
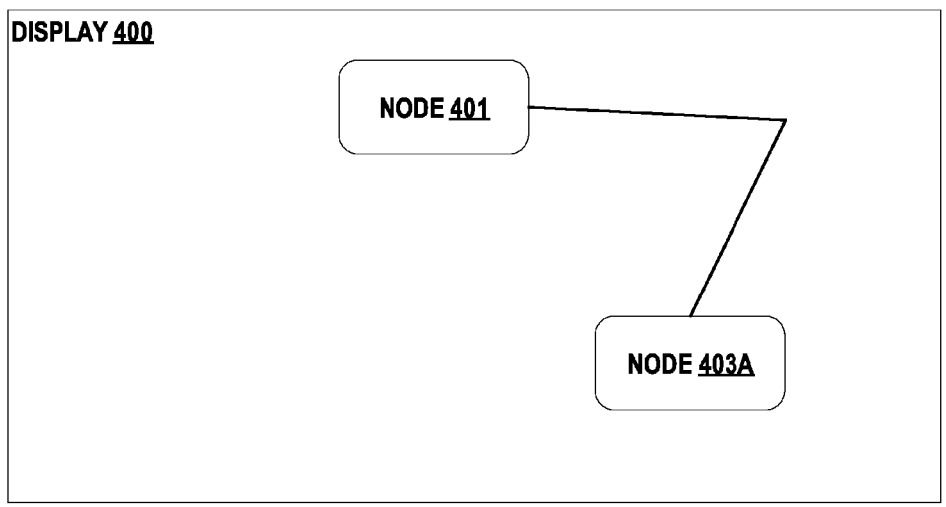
FIG. 4A illustrates an example graph that includes an initial connection having two segments that meet at an elbow to form an acute interior angle.
Figure 4B:
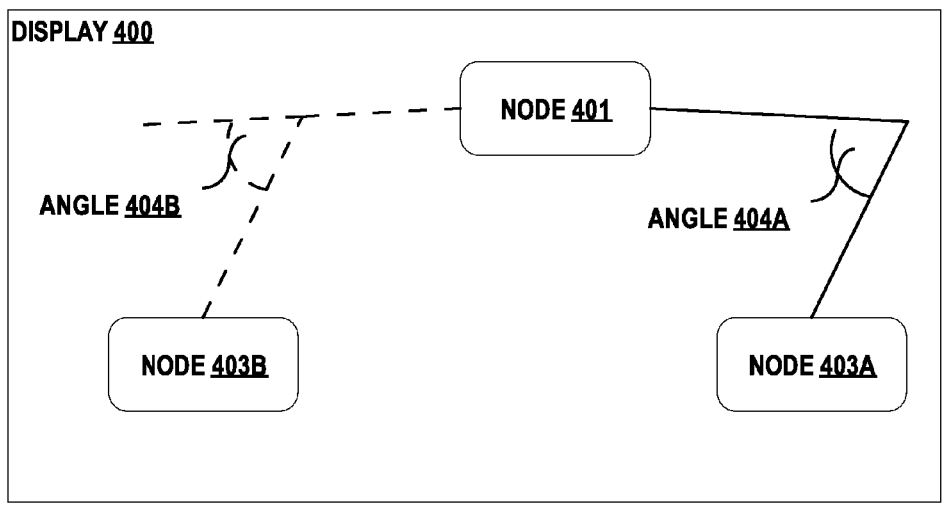
FIG. 4B illustrates an example computation that is performed on the example graph of FIG. 4A to form a proposed new connection, having an exterior angle that matches the interior angle of the initial connection, when a node is dragged from one position to another position on an opposite lateral side of a connected node.
Figure 4C:
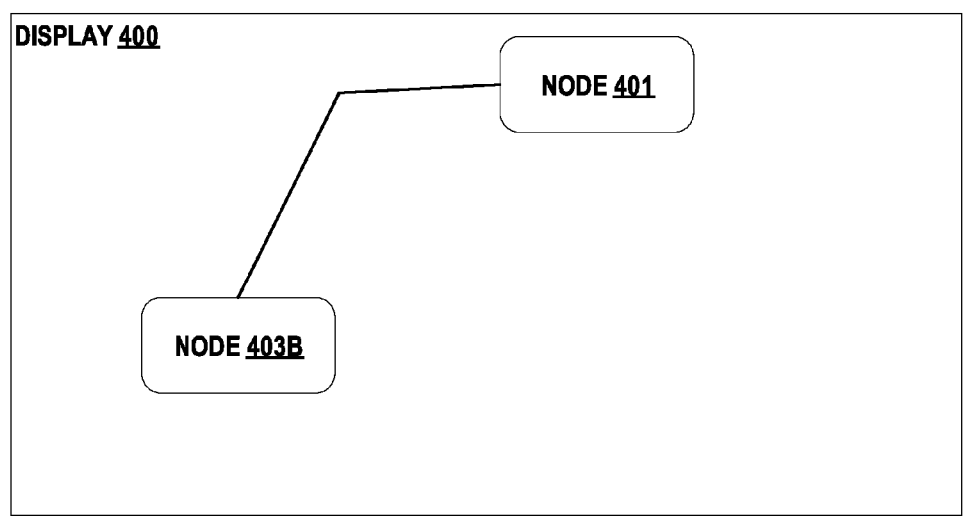
FIG. 4C illustrates the example graph of FIG. 4A with the proposed new connection computed in FIG. 4B after the node has been dragged to the other position.

In another example, illustrated in FIG. 4A, 4B, 4C, a node is moved from a first position to a second position while preserving the angle formed at a connected elbow. FIG. 4A illustrates an example graph that includes an initial connection having two segments that meet at an elbow to form an acute interior angle. The connection connects node 401 to node 403A. As shown in FIG. 4B, the connection between node 401 and node 403A forms an interior angle 404A. A proposed new connection is formed when node 403A is dragged from a first position to a second position, represented as node 403B, on an opposite lateral side of connected or neighboring node 401. After the move, the connection between node 401 and node 403B has an exterior angle 404B that matches interior angle 404A of the initial connection. FIG. 4C illustrates the example graph of FIG. 4A with the proposed new connection computed in FIG. 4B, with the preserved angle, after the node has been dragged to the second position.

Figure 5A:
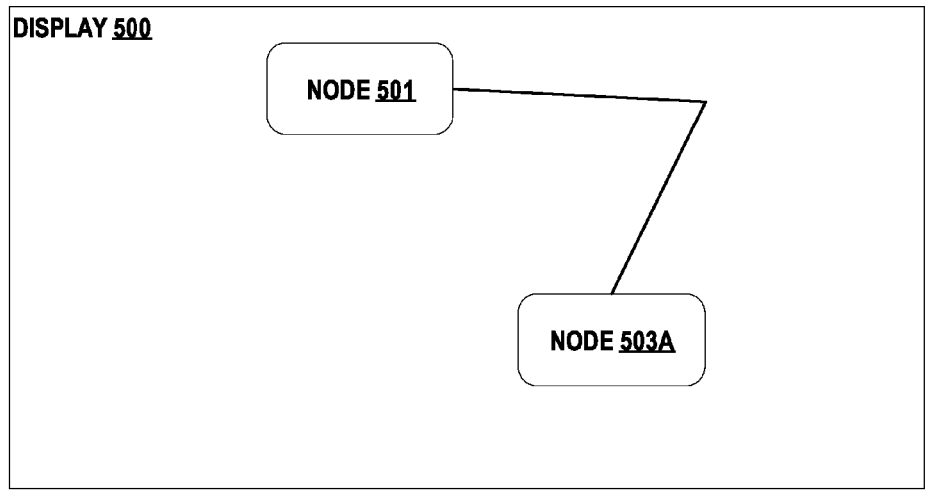
FIG. 5A illustrates an example graph that includes an initial connection having two segments that meet at an elbow to form an acute interior angle.
Figure 5B:
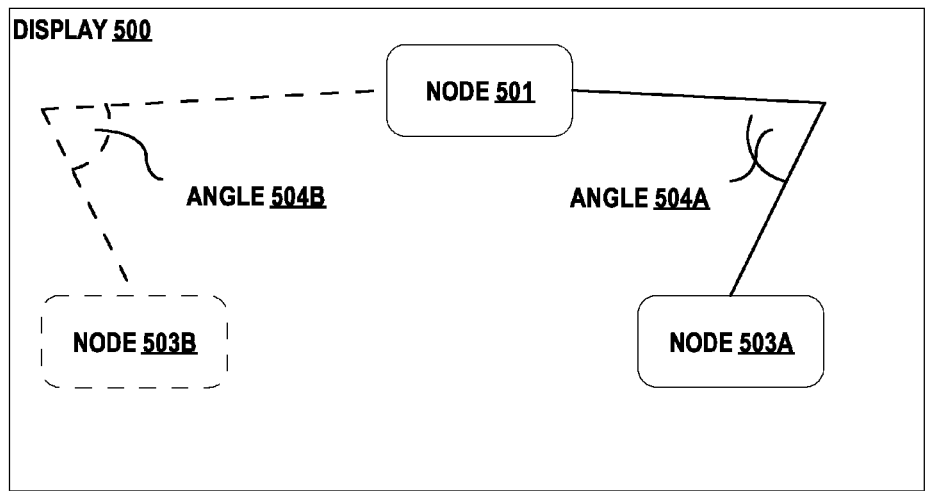
FIG. 5B illustrates an example computation that is performed on the example graph of FIG. 5A to form a proposed new connection, having an interior angle that matches the interior angle of the initial connection, when a node is dragged from one position to another position on an lateral opposite side of a connected node.
Figure 5C:
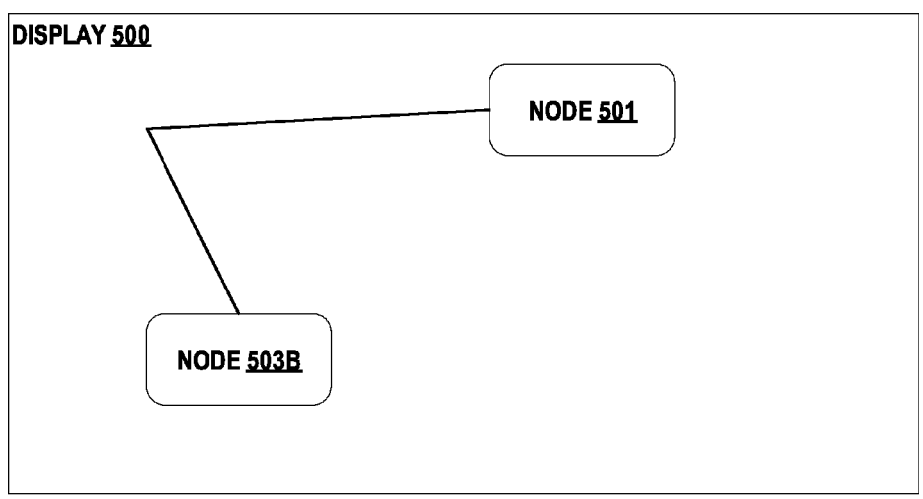
FIG. 5C illustrates the example graph of FIG. 5A with the proposed new connection computed in FIG. 5B after the node has been dragged to the other position.

FIG. 5A, 5B, 5C illustrate another example where a node is moved from a first position to a second position while preserving the angle formed at a connected elbow. FIG. 5A illustrates an example graph that includes an initial connection having two segments that meet at an elbow to form an acute interior angle. The connection connects node 501 to node 503A at an interior angle 504A, as shown in FIG. 5B. A proposed new connection is formed when node 503A is dragged from a first position to a second position, represented as node 503B, on an opposite lateral side of connected or neighboring node 501. After the move, the connection between node 501 and node 503B has an interior angle 504B that matches interior angle 504A of the initial connection. FIG. 5C illustrates the example graph of FIG. 5A with the proposed new connection computed in FIG. 5B, with the preserved angle, after the node has been dragged to the second position.

Figure 6A:
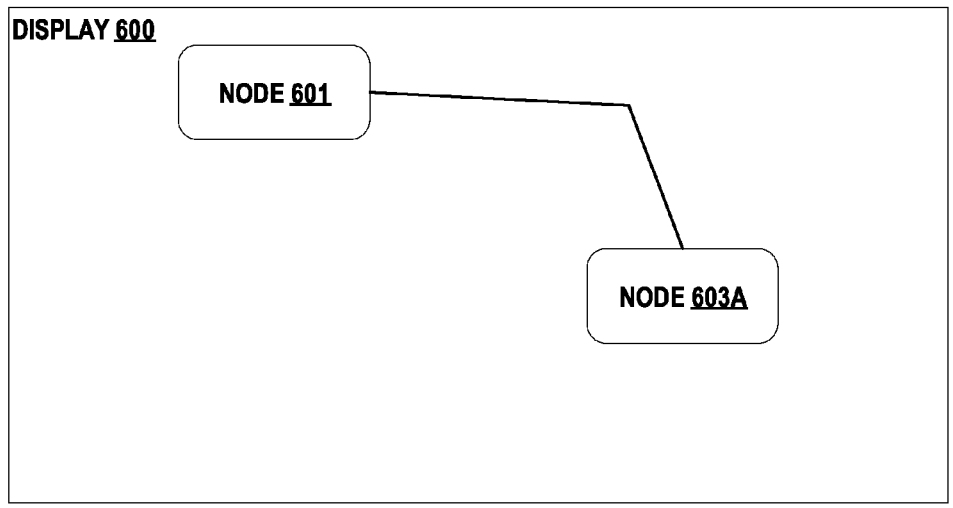
FIG. 6A illustrates an example graph that includes an initial connection having two segments that meet at an elbow to form an obtuse interior angle.
Figure 6B:
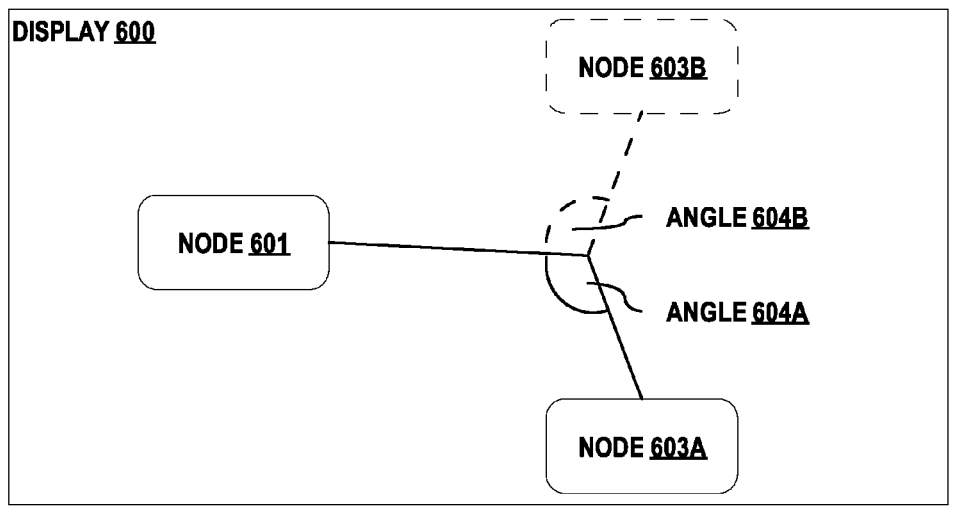
FIG. 6B illustrates an example computation that is performed on the example graph of FIG. 6A to form a proposed new connection, having an interior angle that matches the interior angle of the initial connection, when a node is dragged from one position to another position on an opposite vertical side of a connected node.

FIG. 6A, 6B, 6C illustrate yet another example where a node is moved from a first position to a second position while preserving the angle formed at a connected elbow. FIG. 6A illustrates an example graph that includes an initial connection having two segments that meet at an elbow to form an obtuse angle. The connection connects node 601 to node 603A at an angle 604A, as shown in FIG. 6B. A proposed new connection is formed when node 603A is dragged from a first position to a second position, represented as node 603B, on an opposite vertical side of connected or neighboring node 601. After the move, the connection between node 601 and node 603B has an angle 604B that matches angle 604A of the initial connection. FIG. 6C illustrates the example graph of FIG. 6A with the proposed new connection computed in FIG. 6B, with the preserved angle, after the node has been dragged to the second position.

Figure 8:
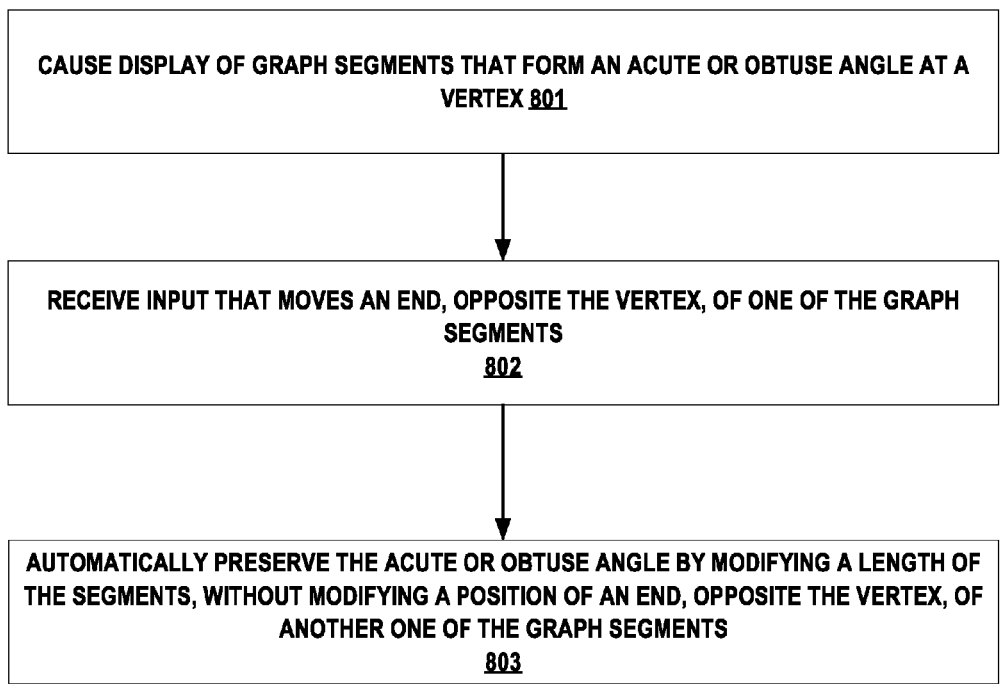
FIG. 8 illustrates an example process for automatically preserving an acute or obtuse angle formed at an elbow of two segments after an end of one of the segments has been moved.

FIG. 8 illustrates an example process for automatically preserving an acute or obtuse angle formed at an elbow of two segments after an end of one of the segments has been moved. In step 801, the process causes display of graph segments that form an acute or obtuse angle at a vertex. In step 802, the process receives input that moves an end, opposite the vertex, of one of the graph segments. The process automatically preserves the acute or obtuse angle in step 803 by modifying a length of the segments, without modifying a position of an end, opposite the vertex of another one of the graph segments.

Figure 13:
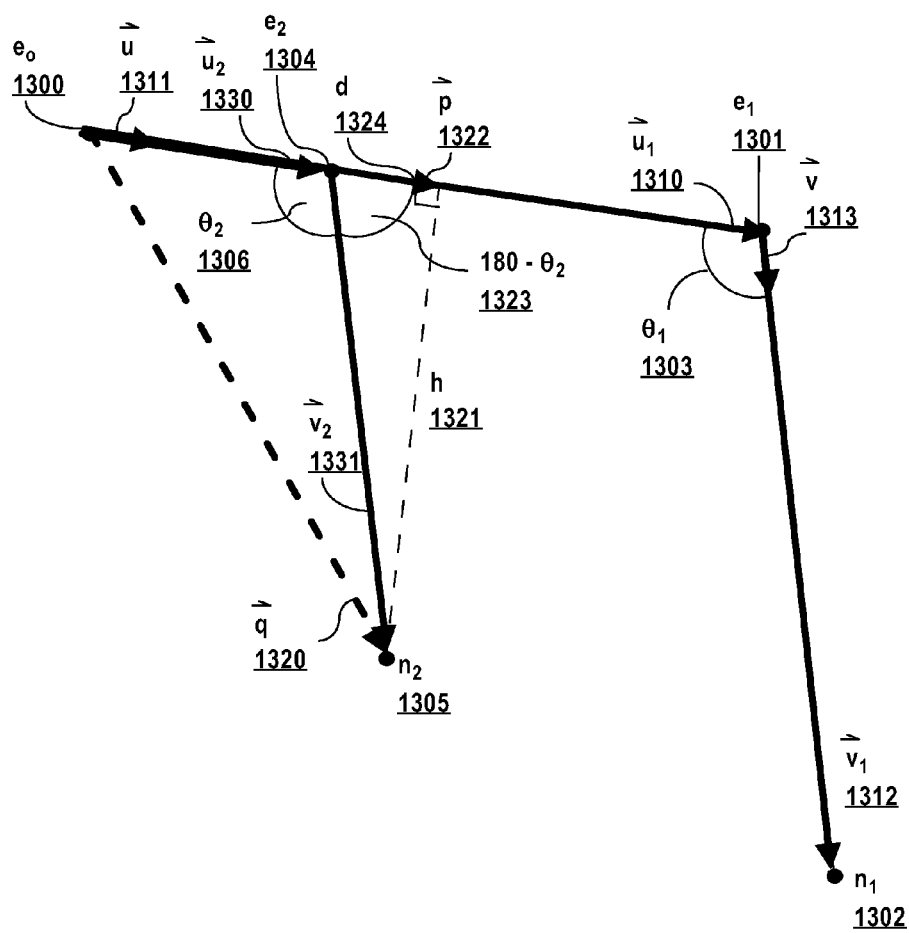
FIG. 13 illustrates example calculations that may be performed to preserve an angle formed at an elbow of two segments after an end of one of the segments has been moved.

FIG. 13 illustrates example calculations that may be performed to preserve an angle formed at an elbow of two segments after an end of one of the segments has been moved. As shown, an elbow or node at position $e_0$ 1300 is initially connected by segments that along vector $u_1$ 1310 and vector $v_1$ 1312 to an elbow or node at position $n_1$ 1302. The segments intersect at an elbow or node position $e_1$ 1301 to form an angle $\theta_1$ 1303. Angle $\theta_1$ 1303 may be computed as $-\cos^{-1}(u \cdot v) - 180$. Based on user input, the elbow or node at position $n_1$ 1302 is moved to new elbow or node position $n_2$ 1305. In response, a graph management device calculates a new elbow or node position $e_2$ 1304 for the elbow or node that was previously positioned at $e_1$ 1301.

Vector u 1311 is computed to be the unit vector of vector $u_1$ 1310, which spans from $e_0$ 1300 to $e_1$ 1301. New vector q 1320 is computed to span from $e_0$ 1300 to $n_2$ 1305. Vector q 1320 is projected onto vector u 1311 to form vector p 1322. The distance between the end of vector q 1320 (elbow or node position $n_2$ 1305) and the end of vector p 1322 is h 1321. Without yet determining elbow or node position $e_2$ 1304, angle $\theta_2$ 1306 is computed to be identical to angle $\theta_1$ 1303, or $-\cos^{-1}(u \cdot v) - 180$. Therefore, the supplementary angle, $180 - \theta_2$ 1323, is computed as $180 - (-\cos^{-1}(u \cdot v) - 180)$, simplified to $\cos^{-1}(u \cdot v)$.

Having computed h 1321 and the supplementary angle 1323, d 1324 is computed as $h \div \tan(180 - \theta_2)$. Vector $u_2$ 1330 spans from $e_0$ 1300 to $e_2$ 1304, and vector $u_2$ 1330 is computed as $(p - d^*u) + e_0$. New elbow or node position $e_2$ 1304 is at the end of vector $u_2$ 1330. A new segment along vector $u_2$ 1330 replaces the segment along vector $u_1$ 1310 in the graph. Vector $v_2$ 1331 spans from $e_2$ 1304 to $n_2$ 1305, and a new segment along vector $v_2$ 1331 replaces the segment along vector $v_1$ 1312 in the graph. After computing the new segments along vectors $u_2$ 1330 and $v_2$ 1331, which intersect at new elbow or node position $e_2$ 1304, the graph management device may display the updated graph with the new segments, where angle $\theta_1$ 1303 before the move is equal to angle $\theta_2$ 1306 after the move.

In one embodiment, before computing the new segments, the graph management device determines whether elbow or node position $e_1$ 1301 before the move is within a threshold distance of elbow or node position $e_0$ 1300 or elbow or node position $n_1$ 1302. The determination that $e_1$ 1301 is within the threshold distance may be satisfied if the length of either $u_1$ or $v_1$ are near zero. For example, if the length of either $u_1$ or $v_1$ amounts to fewer than 5 pixels on the display, then the elbows or nodes may be considered as within the threshold distance of each other. If $e_1$ 1301 is within the threshold distance of either $e_0$ 1300 or $n_1$ 1302, then the elbow or node at position $e_1$ 1301 may be removed from the graph, and the elbow or node at position $e_0$ 1300 may be directly connected to the elbow or node at position $n_1$ 1302 by a single segment spanning from $e_0$ 1300 to $n_1$ 1302.

In one embodiment, after computing the new segments, the graph management device determines whether elbow or node position $e_2$ 1304 after the move is within a threshold distance of elbow or node position $e_0$ 1300 or elbow or node position $n_2$ 1305. The determination that $e_2$ 1304 is within the threshold distance may be satisfied if the length of either $u_2$ or $v_2$ are near zero. If $e_2$ 1304 is within the threshold distance of either $e_0$ 1300 or $n_2$ 1305, then the elbow or node at position $e_2$ 1304 may be removed from the graph, and the elbow or node at position $e_0$ 1300 may be directly connected to the elbow or node at position $n_2$ 1305 by a single segment spanning from $e_0$ 1300 to $n_2$ 1305.

In one embodiment, after computing the new segments, if vector $u_2$ 1330 is in the opposite direction of unit vector u 1311, additional or alternative steps may be taken to preserve the angle and account for the changed position from $n_1$ 1302 to $n_2$ 1305. For example, the connection between $e_0$ 1300 and $n_1$ 1302 may be rotated around $e_0$ 1300 to account for new position $n_2$ 1305. As another example, the connection may be reflected through a line orthogonal to u 1311 at $e_0$ 1300. In yet another example, the interior angle $\theta_1$ 1303 before the move may be swapped for the exterior, supplementary angle after the move. In the illustrated example, preserving the angle may include computing angle $\theta_2$ 1306 as $\cos^{-1}(u \cdot v)$ rather than $-\cos^{-1}(u \cdot v) - 180$. Therefore, angle $180 - \theta_2$ 1323 could be computed as $-\cos^{-1}(u \cdot v) - 180$ rather than $\cos^{-1}(u \cdot v)$. The angle is still preserved, but the angle appears exterior to the elbow rather than interior to the elbow.

In various embodiments, these additional or alternative steps may be performed for some angle values but not other angle values. For example, the additional or alternative steps may be performed if angle $\theta_2$ 1306 is acute, obtuse, greater than or less than 135 degrees, or greater than or less than 45 degrees. Other threshold angles could also be used to trigger the additional or alternative steps. Various implementations could vary, and one set of rules may work well and satisfy users' intents for a given graph management device but not for another graph management device. The rules may be customized by a software developer, administrator, or user, such that the graph management device responds in a manner that is desired by the user.

Preserving Segment Length, Direction, Endpoint Position

In one embodiment, instead of or in addition to preserving the angle after the move, the length and/or direction of one or more of the segments in the connection may also be preserved after the move. At least part of a connection should change in order to account for a changing position of a node at one end of the connection on a graph. However, the part of the connection that changes to account for the move may vary from implementation to implementation. In one implementation, preserving the direction of both segments in a two-segment connection may result in preservation of the angle formed by the two segments. The direction of the segment may be preserved if a vector representing the segment after the move is in the same or an opposite direction as a vector representing the segment before the move. In another implementation, preserving the direction of only one of the two segments may result in a change in the angle formed by the two segments. These different implementations may be beneficial to the user in different scenarios, or for different purposes.

Similarly, various implementations may allow segment lengths to be locked. If one segment length is locked, other segment lengths, endpoint positions, angles formed by segments, and/or segment directions may be modified to account for the move and preserve the locked segment. Preserving the angle between two segments may or may not be possible, in different scenarios, if the length of one of the two segments is preserved.

Also, various implementations may allow one or both endpoints of a segment to be locked. In the one or more endpoints are locked, other endpoint positions, segment directions, angles formed by segments, or segment lengths may be modified to account for the move and preserve the locked endpoints. Preserving the angle between two segments may or may not be possible, in different scenarios, if segment endpoints are preserved.

Therefore, locks on segment lengths, directions, angles formed by segments, and segment or endpoint positions may be prioritized such that the highest priority locks are preserved at the expense of violating the lower priority locks. The graph management device uses the prioritization of the different locks to determine which graph elements to modify after a move and which graph elements to preserve after a move.

Snapping Connection to Specified Angle

In one embodiment, when an endpoint of a connection is moved from a first position to a second position, the connection snaps to a specified angle. Snapping may occur when the endpoint is moved to a second position that would otherwise cause the angle to be within a threshold distance of the specified angle. In one example, the angle is snapped to a 90 degree angle when an endpoint is moved to a position that is within a threshold number of pixels or other units of a position that would form a 90 degree angle. In another example, the angle is snapped to a 180 degree angle when an endpoint is moved to a position that is within a threshold number of pixels or other units of a position that would form a 180 degree angle. When the angle is snapped to 180 degrees, an elbow that previously existed on the connection may be removed.

Snapping may also occur when the endpoint is moved to a second position that would cause a segment in the connection to be below a threshold length. Any segments that are below the threshold length after the move may be removed from the connection. Removing segments may have a snapping effect, as the result eliminates an elbow that previously existed in the connection. For example, if two segments meet at a 45 degree angle, and an endpoint of one of the segments is moved such that either of the segments would be below a threshold length, then the segment below the threshold length may be removed from the connection. In the example, if the segment is removed, then the connection would be a single-segment connection that snaps from 45 degrees to a straight line or 180 degrees.

When an endpoint is moved by user input, a connection affected by the movement may be snapped to a specified angle. If the connection is snapped to the specified angle, the graph management device may move the endpoint to a different position than the position at which the user input moved the endpoint. For example, if an endpoint is moved to a first position that is near (i.e., within a threshold distance of) a second position that would form a connection of a specified angle, then the endpoint may be further moved to the second position in order to form the specified angle. As another example, if an endpoint is moved to a first position that is near (i.e., within a threshold distance of) a second position that would eliminate a segment of the connection by reducing the segment to a length of zero, then the endpoint may be further moved to the second position in order to reduce the segment to the length of zero.

In another embodiment, if the user input moves a connection endpoint to a position, the position specified by the user input may be preserved during the snapping. For example, if the endpoint is moved to a first position that is near a second position that would form a connection at a specified angle, then the connection may be snapped to the specified angle by changing one or more elbow positions and one or more segment directions in the connection while preserving the first position. In a particular example, for a two-segment connection, an end of a first segment may be moved to the first position, and a direction of a second segment and elbow position between the segments may be adjusted to snap the angle to the specified angle.

In another example, if the endpoint is moved to a first position that is near a second position that would eliminate a segment, then the connection may be snapped to remove the segment by changing one or more elbow positions and one or more segment directions in the connection. In a particular example, for a two-segment connection, an end of a first segment may be moved to the first position, and a direction of a second segment may be adjusted so that the first and second segments may be snapped together to form a single segment, at 180 degrees, optionally without an elbow.

Figure 2A:
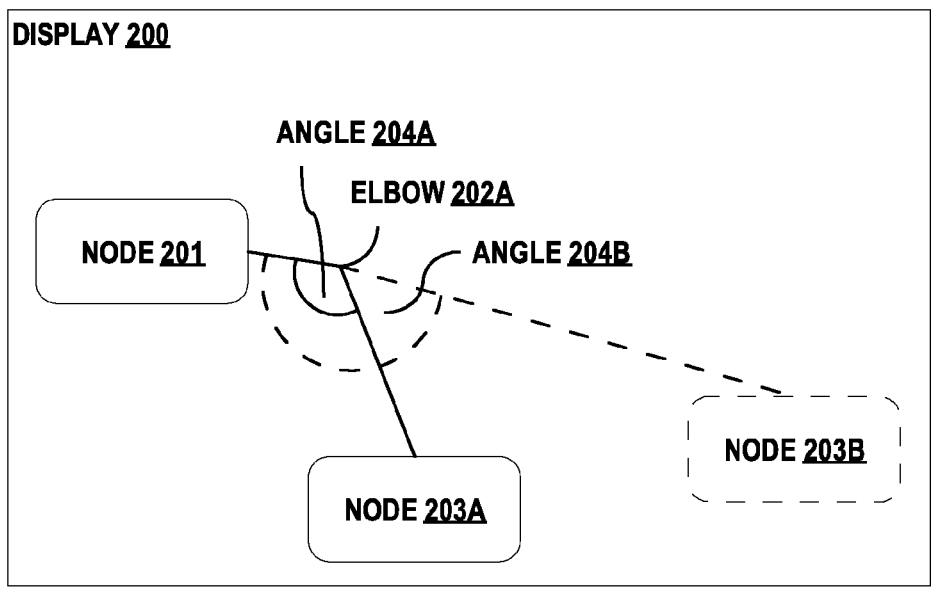
FIG. 2A illustrates an example computation that is performed on the example graph of FIG. 1A to form a proposed new connection when a node is dragged from one position to another position that is nearly on the same line as a connected node and the elbow.
Figure 2B:
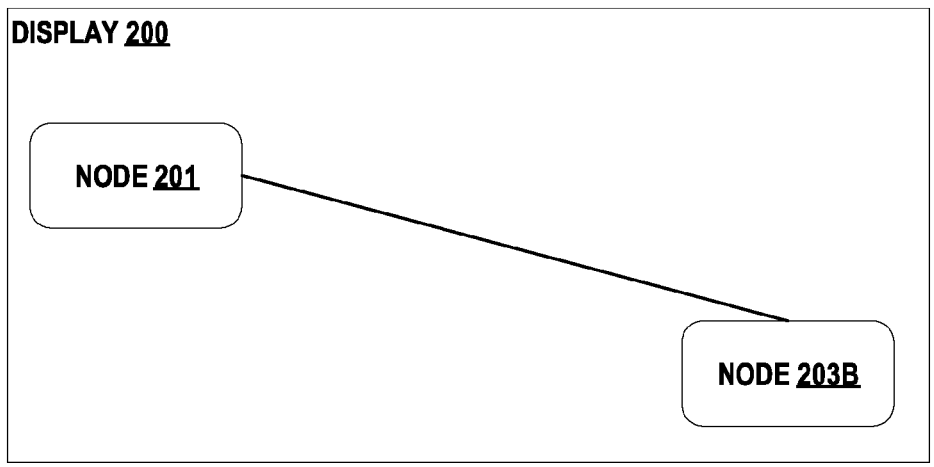
FIG. 2B illustrates the example graph of FIG. 1A, snapped to a straight line based on the proposed new connection computed in FIG. 2A, after the node has been dragged to the other position.

FIG. 2A illustrates an example computation that is performed on the example graph of FIG. 1A to form a proposed new connection when a node is dragged from one position (indicated by node 203A) to another position (indicated by node 203B) that is nearly on the same line as a connected node 201 and an elbow 202A. In the example, a first segment from node 201 to elbow 202A remains locked during the move. If a second segment from elbow 202A to node 203A were to be redrawn as a segment between elbow 202A and node 203B, then the angle formed by the first and second segments would be near or within a threshold distance of 180 degrees. If the graph management device is configured to snap angles to 180 degrees, then the first and second segments may be replaced by a third segment, or snapped to a straight line, directly between node 201 and segment 203B, as shown in FIG. 2B. In the illustrated embodiment, the position of node 203B is preserved during the snapping. In an alternate embodiment, the graph management device may move node 203B such that node 203B is along a same line as node 201 and elbow 202A.

Figure 3A:
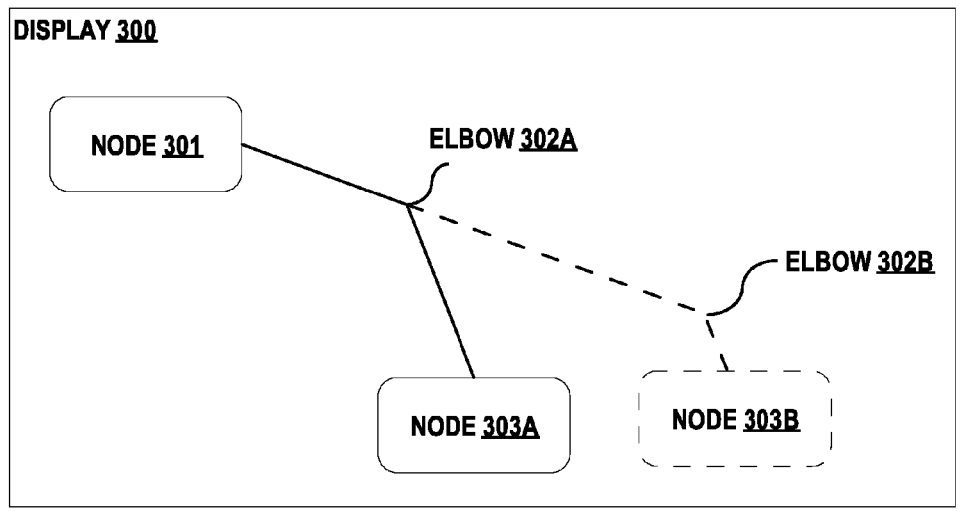
FIG. 3A illustrates an example computation that is performed on the example graph of FIG. 1A to form a proposed new connection when a node is dragged from one position to another position that, if the angle of the initial connection were to be preserved, would create a segment that is below a threshold length.
Figure 3B:
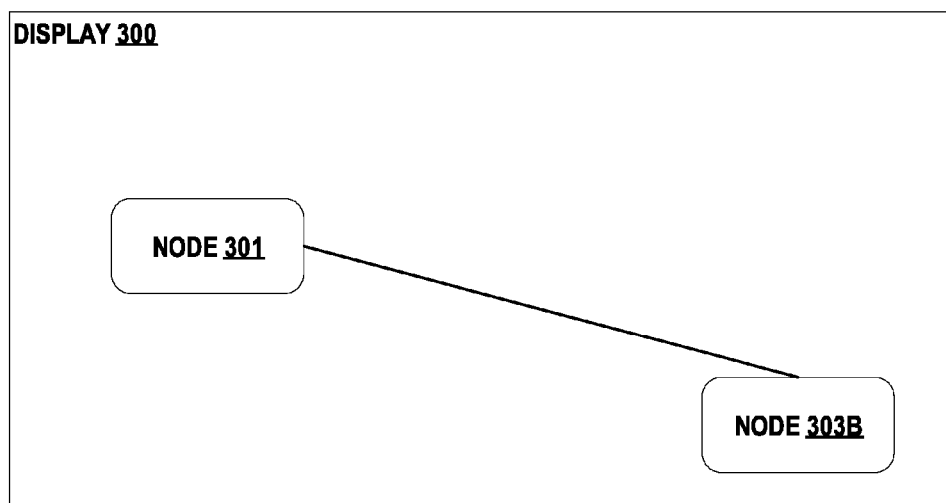
FIG. 3B illustrates the example graph of FIG. 1A, snapped to a straight line based on the proposed new connection computed in FIG. 3A, after the node has been dragged to the other position.

FIG. 3A illustrates an example computation that is performed on the example graph of FIG. 1A to form a proposed new connection when a node is dragged from one position (indicated by node 303A) to another position (indicated by node 303B). If the angle of the initial connection (formed by node 301, elbow 302A, and node 303A) were to be preserved, the proposed new connection (formed by node 301, elbow 302B, and node 303B) would include a segment that is below a threshold length. As shown, although the angle is preserved from the initial connection to the proposed new connection, the segment from elbow 302B to node 303B is short. If the short segment is displayed on a graph, a user may have difficulty detecting the segment, let alone trying to select and modify the segment. As shown in FIG. 3B, because the segment from elbow 302B to node 303B is below a threshold length, the proposed new connection (from node 301 to elbow 302B to node 303B) is replaced with a single segment, or snapped to a 180 degree angle, from node 301 to node 303B.

In the illustrated embodiment, the position of node 303B is preserved during the snapping. In an alternate embodiment, the graph management device may move node 303B such that node 303B is along a same line as node 301 and elbow 302A.

Figure 9:
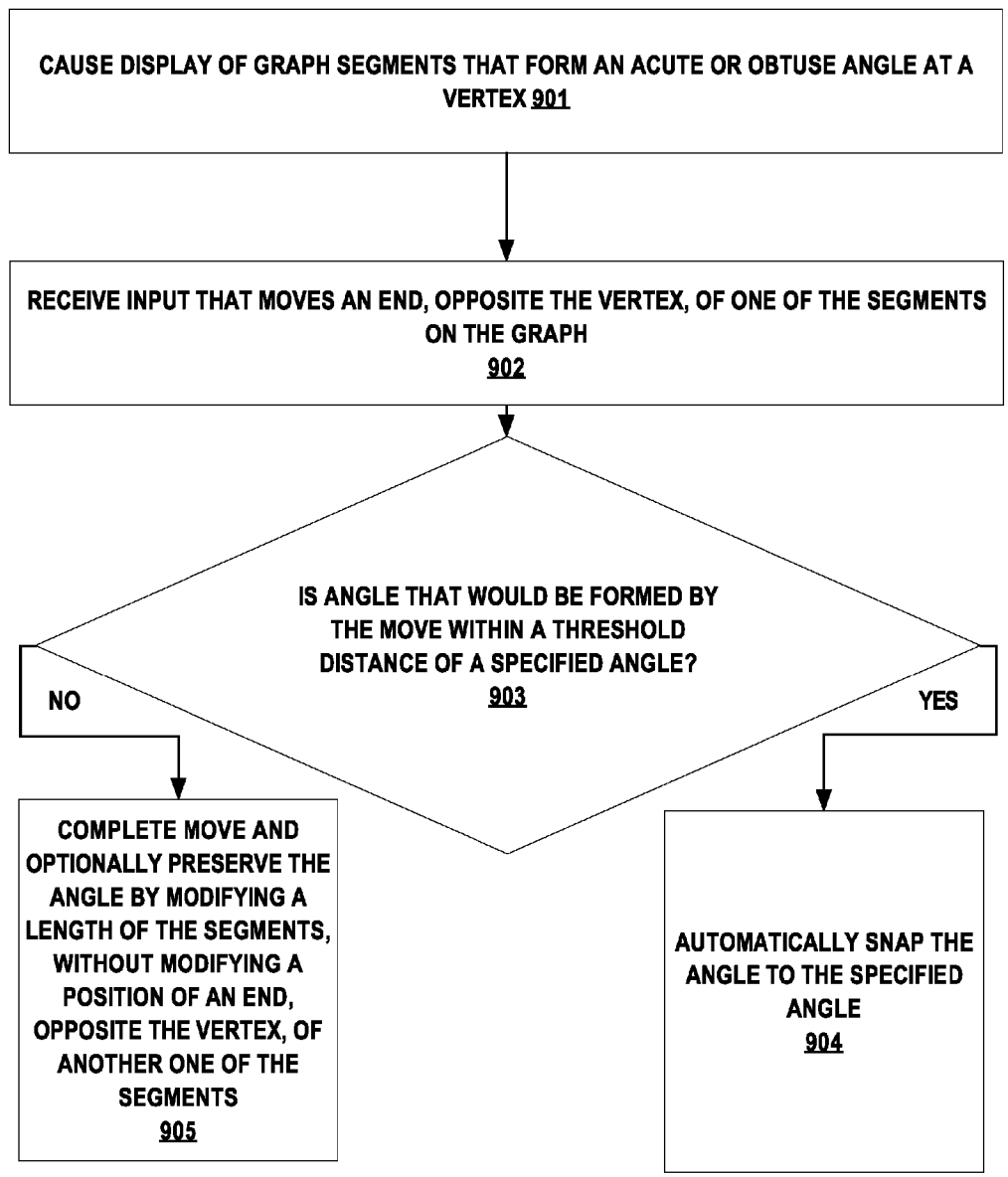
FIG. 9 illustrates an example process for snapping a connection to a specified angle when the angle that would be formed after the move is within a threshold distance of the specified angle.

FIG. 9 illustrates an example process for snapping a connection to a specified angle when the angle that would be formed after the move is within a threshold distance of the specified angle. In step 901, the graph management device causes display of a graph of segments that form an acute or obtuse angle at a vertex. In step 902, the graph management device receives input that moves an end, opposite the vertex, of one of the segments on the graph. The graph management device determines, in step 903, as to whether the angle that would be formed by the move is within a threshold distance of a specified angle, such as 180 degrees. For example, the graph management device may determine the number of pixels or units that a proposed new position of the end is from a position that would form the specified angle. If the proposed new position of the end is not within the threshold distance of a position that would form the specified angle, the move is completed in step 905, and the angle may optionally be preserved by modifying a length of the segments, without modifying a position of an end, opposite the vertex, of another one of the segments. If the angle that would be formed by the move is within a threshold distance of a specified angle, the graph management device automatically snaps the segments to the specified angle in step 904. For example, if the specified angle is 180 degrees, the graph management device may automatically replace two segments with a single segment. Optionally, the snapping may be displayed as a moving transition to the specified angle.

Figure 10:
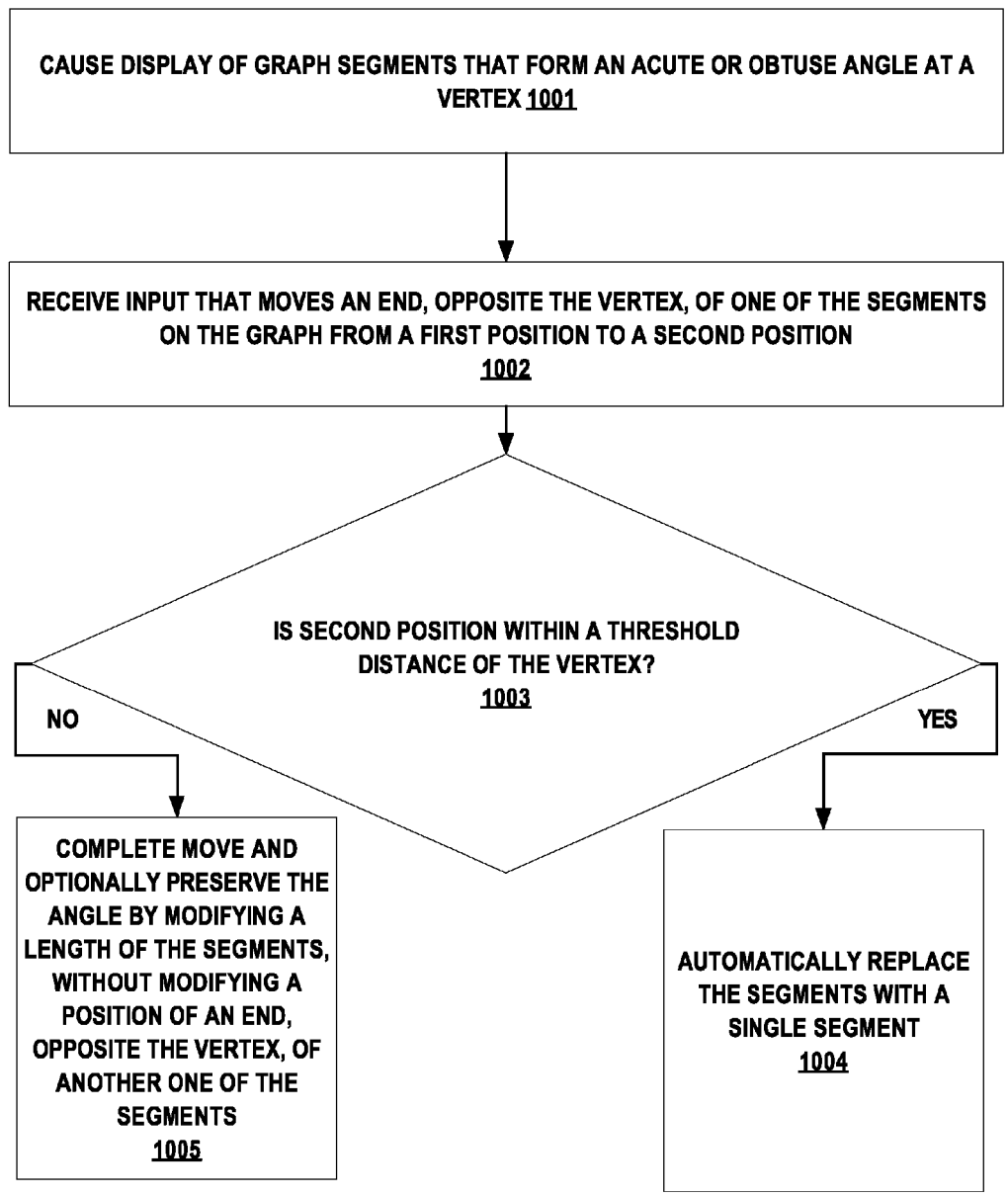
FIG. 10 illustrates an example process for snapping a connection to a straight line when one of the segments would have less than a threshold length after the move.

FIG. 10 illustrates an example process for snapping a connection to a straight line when one of the segments would have less than a threshold length after the move. In step 1001, the graph management device causes display of a graph of segments that form an acute or obtuse angle at a vertex. In step 1002, the graph management device receives input that moves an end, opposite the vertex, of one of the segments on the graph from a first position to a second position 1002. The graph management device determines, in step 1003, as to whether the second position is within a threshold distance of the vertex. For example, the graph management device may determine the number of pixels or units that a proposed new position of the end is from the vertex. If the proposed new position of the end is not within the threshold distance of the vertex, the move is completed in step 1005, and the angle may optionally be preserved by modifying a length of the segments, without modifying a position of an end, opposite the vertex, of another one of the segments. If the proposed new position of the end is within a threshold distance of the vertex, the graph management device automatically snaps the segments to a single segment, such as a straight line, in step 904. In other words, the graph management device may automatically replace the two segments with a single segment. Optionally, the snapping may be displayed as a moving transition from the two segments to the single segment.

Figure 11:
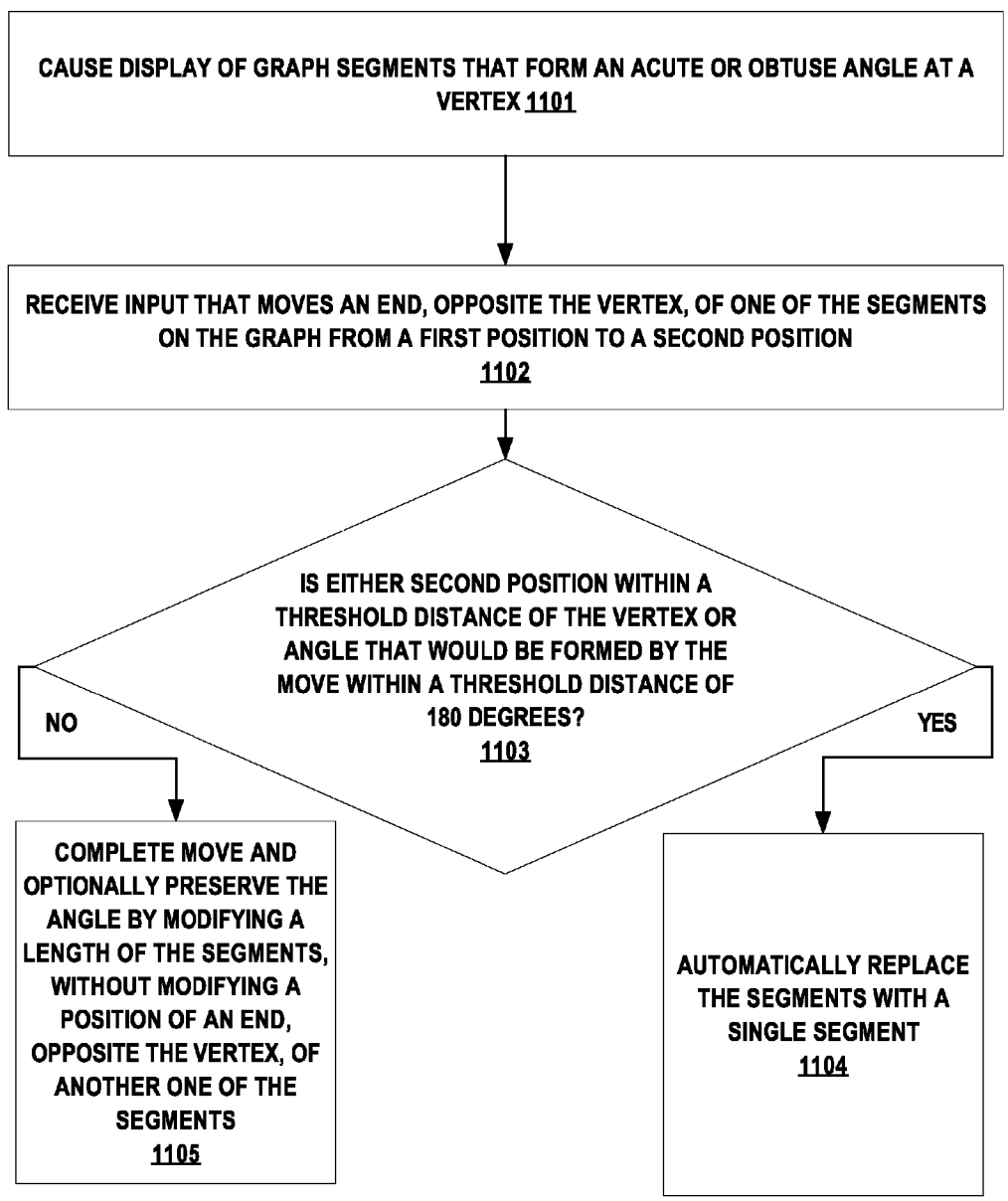
FIG. 11 illustrates an example process for snapping a connection to a straight line when, after the move, either the angle that would be formed is within a threshold distance of 180 degrees, or one of the segments would have less than a threshold length.

FIG. 11 illustrates an example process for snapping a connection to a straight line when, after the move, either the angle that would be formed is within a threshold distance of 180 degrees, or one of the segments would have less than a threshold length. In step 1101, the graph management device causes display of a graph of segments that form an acute or obtuse angle at a vertex. In step 1102, the graph management device receives input that moves an end, opposite the vertex, of one of the segments on the graph from a first position to a second position. The graph management device determines, in step 1103, as to whether either the second position is within a threshold distance of the vertex or whether the angle that would be formed by the move is within a threshold distance of 180 degrees. If neither of these is true, then the move is completed in step 1105, and the angle may optionally be preserved by modifying a length of the segments, without modifying a position of an end, opposite the vertex, of another one of the segments. If the determination of step 1103 is true, then the graph management device automatically replaces the segments with a single segment, snapping the connection to 180 degrees.

Structural Overview

Figure 7:
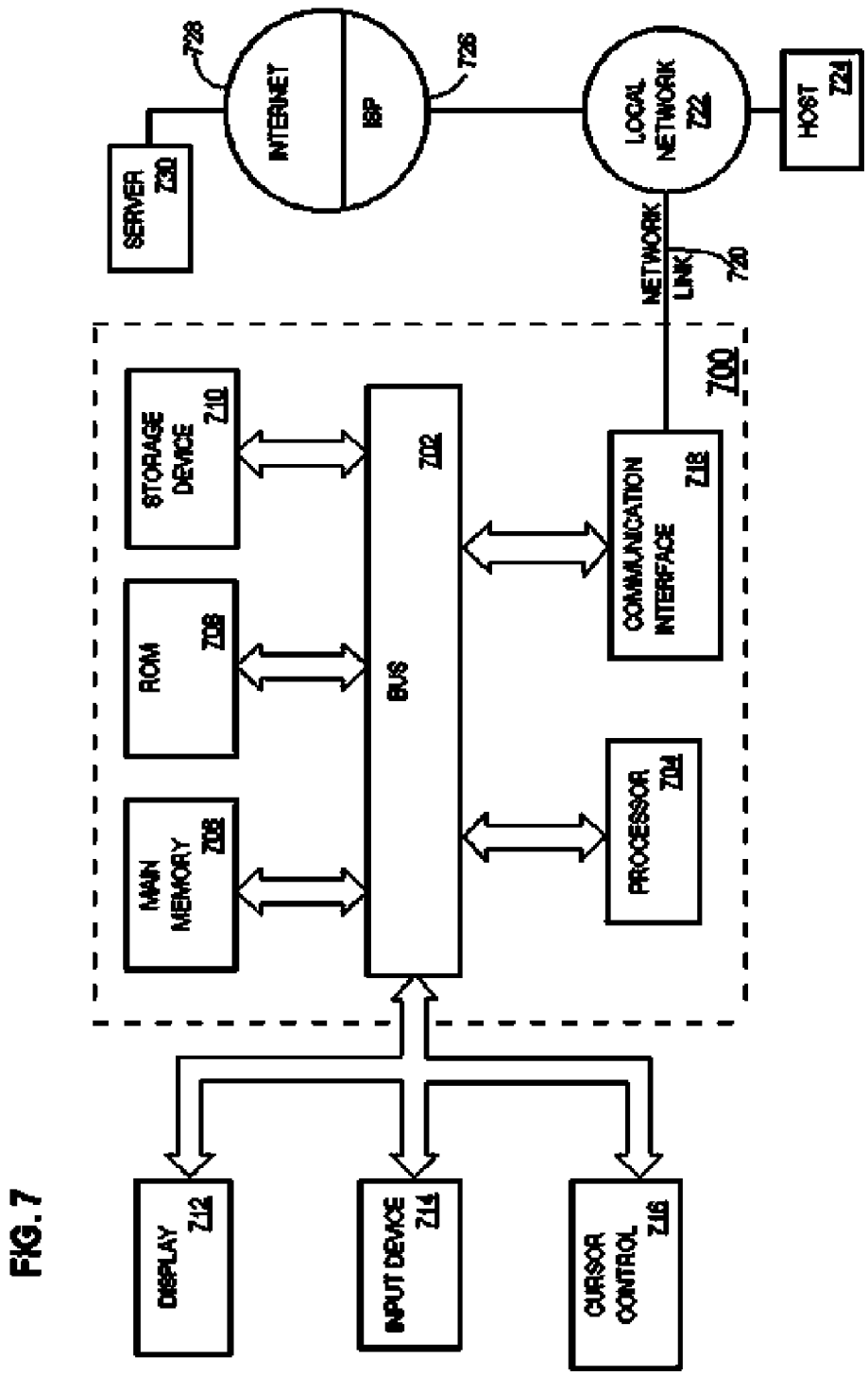
FIG. 7 illustrates a computer system on which an embodiment of a graph management system may be implemented.
Figure 12:
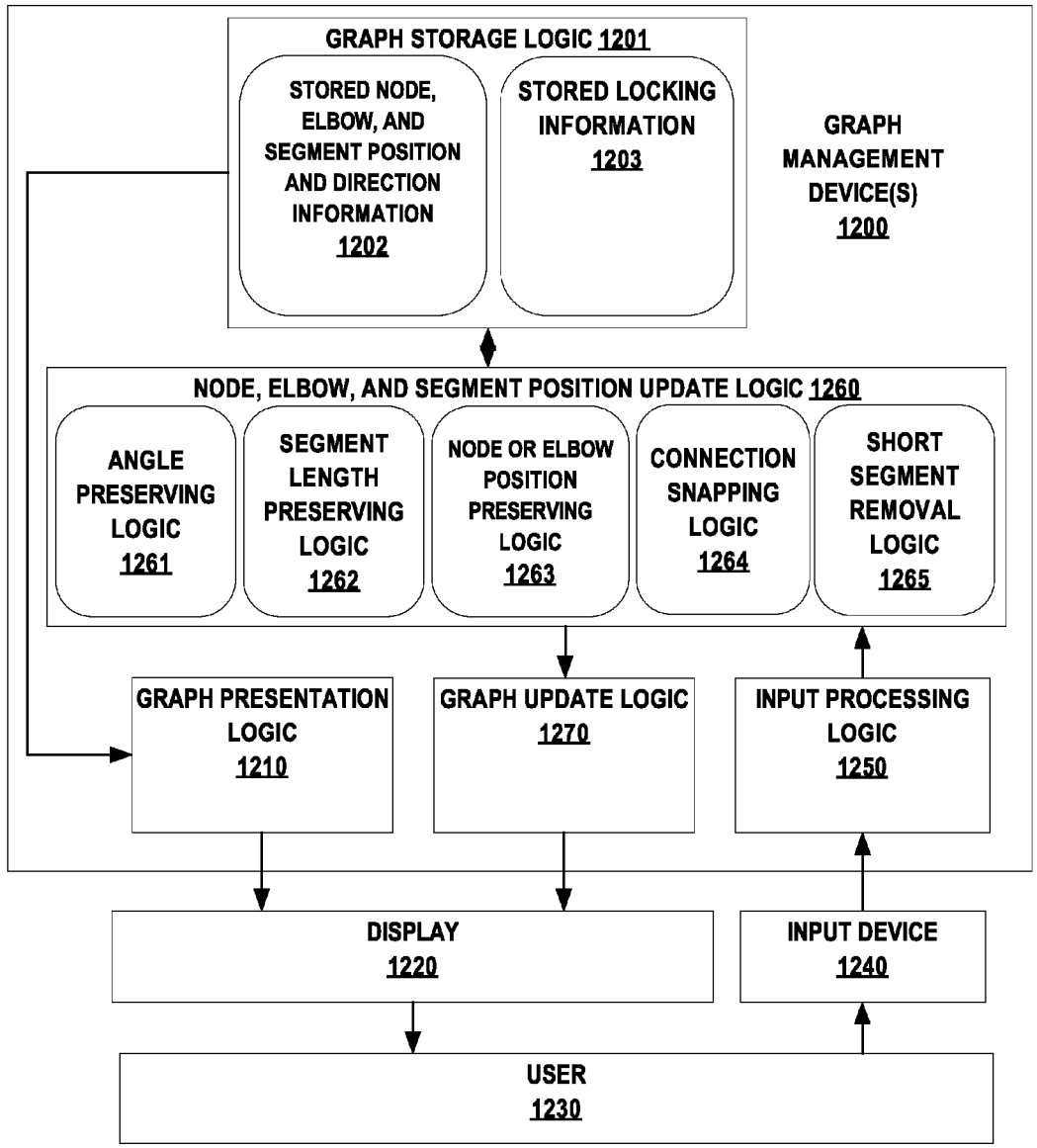
FIG. 12 illustrates an example system for preserving an angle of a connection, preserving a segment length of the connection, preserving a node or elbow position of the connection, or snapping the connection to a specified angle after a node is moved from one position to another position.

Techniques for preserving angles of graph elbows may be embodied in virtually any type of computer system, including a computer system such as the example computer system 700 of FIG. 7 or the example graph management device 1200 of FIG. 12.

Graph Storage Logic

The example graph management device 1200, as illustrated in FIG. 12, includes graph storage logic 1201 for storing node, elbow, and segment position and direction information 1202, and locking information 1203. The graph storage logic is not limited to any particular manner for storing the information 1202 and 1203. For example, the information 1202 and 1203 may be stored on one or more volatile or non-volatile storage media. The information 1202 and 1203 may be stored in a structured or unstructured manner. If stored in an unstructured manner, the information 1202 and 1203 may include data indicators that allow a parser such as graph presentation logic 1210 to determine what information is being stored, and the format of the stored information. If stored in a structured manner, the parser may make assumptions about the format and organization of the stored information based on a model to which the stored information conforms.

In one example, the stored information 1202 and 1203 is stored in Extensible Markup Language (XML) documents. The XML documents may include segment fields and endpoint fields. Each endpoint field may include a position value of the endpoint, a unique identity value assigned to the endpoint, and locking information 1203 that indicates whether the endpoint is locked and a priority value that indicates the importance of keeping the endpoint locked. Each segment field may identify endpoints that form the segment and locking information 1203 for the segment that indicates whether the segment position (i.e., the endpoints of the segment) and/or the segment direction are locked. In one embodiment, the stored information conforms to a document object model that specifies an arrangement and format for storing the information.

Graph Presentation Logic

Graph presentation logic 1210 retrieves information from storage logic 1201, and presents the information on display 1220. In one example, graph presentation logic 1210 includes a parser for parsing information from the storage logic 1201. Graph presentation logic may also include a drawing logic for drawing a graph that includes graph elements determined from the stored information. The graph presentation logic may utilize a video card or other specialized graphics processing component on graph management device 1200 to prepare the graph to be displayed on display 1220. A graph including nodes, elbows, and segments retrieved from storage logic 1201 is presented on display 1220 for viewing by a user 1230. In one embodiment, graph presentation logic 1210 sends a graph to display 1220 over a network, which may be localized or non-localized. In another embodiment, display 1220 is connected directly to graph management device 1200.

Input Processing Logic

Input processing logic 1250 receives and processes user input from input device 1240. Input device 1240 may be a mouse, touch screen, keyboard, or any other input device. In one embodiment, input device 1240 is connected to input processing logic 1250 over a network, which may be localized or non-localized. In another embodiment, input device 1240 is connected directly to graph management device 1200. User input may include any input that selects, moves or drags, de-selects or drops, or performs any other action on graph elements. Input processing logic 1250 processes the user input to determine how the user input relates to the graph that was displayed to the user. In one embodiment, input processing logic 1250 analyzes the user input to determine that the user has moved an endpoint from one position to another position on the graph. Input processing logic may provide the identity of the endpoint and the new position to node, elbow, and segment position update logic 1260.

Node, Elbow, and Segment Position Update Logic

Node, elbow, and segment position update logic 1260 receives information that indicates a graph element is being moved from one position to another position on the graph. Node, elbow, and segment position update logic 1260 uses the received information and information from storage logic 1201 to determine how the nodes, elbows, and segments should be presented after the move. In one embodiment, node, elbow, and segment position update logic 1260 uses stored locking information 1203 to determine which graph elements should remain locked, and which graph elements should move to accommodate the changing endpoint position. In another embodiment, node, elbow, and segment position update logic 1260 includes default rules for determining which graph elements should remain locked, and which graph elements should move to accommodate the changing endpoint position.

Node, elbow, and segment position update logic 1260 may include any or all of the following: an angle preserving logic 1261 for preserving angles as endpoints are moved on the graph; a segment length preserving logic 1262 for preserving lengths of segments as endpoints are moved on the graph; a node or elbow position preserving logic 1263 for preserving node or elbow positions as endpoints are moved on the graph; a connection snapping logic 1264 for snapping connections to specified angles; and a short segment removal logic 1265 for removing segments that are shorter than a specified length. The various logics may be implemented in hardware, software, or a combination thereof. If logics are implemented in software, the software runs on one or more computing devices to perform a desired function or procedure.

In one embodiment, the logics include stored functions or procedures that are evaluated by one or more processors when the functions or procedures are called by a graph management process. The graph management process may pass one or more inputs into the stored functions or procedures, and the stored functions or procedures may output one or more outputs. The inputs and/or outputs may be passed within the call to the functions or procedures or by changing stored variables that are referenced by the functions or procedures.

Node, elbow, and segment position update logic 1260 determines new node, elbow, and segment positions as the result of input that moves a graph element from one position to another position. The move of the graph element may or may not affect various other graph elements. Node, elbow, and segment position update logic 1260 may output positions of all graph elements, or may output updated positions of only those graph elements that are affected by the move.

Graph Update Logic

Graph update logic 1270 may be implemented as part of graph presentation logic 1210 or separately from graph presentation logic 1210. Graph update logic 1270 receives information from node, elbow, and segment position update logic 1260 that indicates one or more graph elements have changed position. Graph update logic 1270 updates the graph that is being displayed to the user to reflect the updated positions of the graph elements.

In various embodiments, positions may be updated on the graph before the move has been finalized by user 1230. For example, positions may be updated as a node is selected and moved or dragged from one position to another position on the graph. As another example, positions may be updated only when the position has been de-selected or dropped at a destination position. Updating the graph as the node is moved as well as when the node is dropped at the destination position allows a user to see the results that should be expected as the node is dragged, before the user de-selects the node. The expected results are validated when the user drops the node.

Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Extensions and Alternatives

In the foregoing specification, embodiments of the invention have been described with reference to numerous specific details that may vary from implementation to implementation. The sole and exclusive indicator of what is the invention in this application, and is intended by the applicants to be the invention in this application, is the set of claims that issue from this application, in the specific form in which such claims issue, including any subsequent correction. No limitation, element, property, feature, advantage or attribute that is not expressly recited in a claim should limit the scope of such claim in any way. The specification and drawings are, accordingly, to be regarded in an illustrative rather than a restrictive sense. Applicant reserves the right to pursue continuation, divisional, or continuation-in-part applications that are supported at least in part by this disclosure and are directed to embodiments of the invention that are different from the embodiments claimed in this application.

What is claimed is:

1. A process comprising:
    one or more computing devices causing, on a computer display device, display of a graph comprising a first segment and a second segment, wherein the first segment and the second segment form an acute or obtuse angle at a vertex, wherein the first segment comprises a first end opposite the vertex at a first position on the graph, and wherein the second segment comprises a second end opposite the vertex at a second position on the graph;
    the one or more computing devices receiving input that moves the second end from the second position to a third position on the graph;
    in response to the input, the one or more computing devices automatically preserving the acute or obtuse angle by modifying a length of the first segment and a length of the second segment, and modifying the first segment by mirroring the first segment over a vertical axis or a horizontal axis;
    wherein the one or more computing devices automatically preserve the acute or obtuse angle by swapping an interior angle formed by the first position, the vertex, and the second position for an exterior angle, supplementary to the interior angle, formed by the first segment, the vertex, and the third position.

2. The process of claim 1, wherein the input comprises a selection of the second end at the second position, a dragging of the second end to the third position, and a de-selection of the second end at the third position.

3. The process of claim 2, further comprising the one or more computing devices causing display of a proposed position of the second end as the second end is dragged from the second position to the third position, wherein the proposed position is different than the second position and the third position.

4. The process of claim 2, wherein the one or more computing devices automatically preserving the angle is in response to the de-selection of the second end at the third position.

5. The process of claim 1, further comprising, in response to the input, the one or more computing devices modifying the first segment by mirroring the first segment over a vertical axis.

6. The process of claim 1, further comprising, in response to the input, the one or more computing devices modifying the first segment by mirroring the first segment over a horizontal axis.

7. The process of claim 1, further comprising:
    causing display, at the first end, of a first graphical element that represents a first object comprising a plurality of data items;
    causing display, at the second end, of a second graphical element that represents a second object comprising a plurality of data items;
    wherein the first segment and the second segment represent a relationship between the first object and the second object; and wherein the input moves the second graphical element from the second position to the third position.

8. One or more non-transitory computer-readable storage media storing instructions which, when executed by one or more computing devices, cause the one or more computing devices to perform:
    causing display of a graph comprising a first segment and a second segment, wherein the first segment and the second segment form an acute or obtuse angle at a vertex, wherein the first segment comprises a first end opposite the vertex at a first position on the graph, and wherein the second segment comprises a second end opposite the vertex at a second position on the graph;
    receiving input that moves the second end from the second position to a third position on the graph;

in response to the input, automatically preserving the acute or obtuse angle by modifying a length of the first segment and a length of the second segment, and modifying the first segment by mirroring the first segment over a vertical axis or a horizontal axis;

wherein the one or more computing devices automatically preserve the acute or obtuse angle by swapping an interior angle formed by the first position, the vertex, and the second position for an exterior angle, supplementary to the interior angle, formed by the first segment, the vertex, and the third position.

9. The one or more non-transitory computer-readable storage media of claim 8, wherein the input comprises a selection of the second end at the second position, a dragging of the second end to the third position, and a de-selection of the second end at the third position.

10. The one or more non-transitory computer-readable storage media of claim 9, wherein the instructions, when executed by one or more computing devices, further cause display of a proposed position of the second end as the second end is dragged from the second position to the third position, wherein the proposed position is different than the second position and the third position.

11. The one or more non-transitory computer-readable storage media of claim 9, wherein the instructions, when executed by one or more computing devices, cause automatically preserving the angle in response to the de-selection of the second end at the third position.

12. The one or more non-transitory computer-readable storage media of claim 8, wherein the instructions, when executed by one or more computing devices, further cause, in response to the input, modifying the first segment by mirroring the first segment over a vertical axis.

13. The one or more non-transitory computer-readable storage media of claim 8, wherein the instructions, when executed by one or more computing devices, further cause modifying the first segment by mirroring the first segment over a horizontal axis.

14. The one or more non-transitory computer-readable storage media of claim 8, wherein the instructions, when executed by one or more computing devices, further cause:
- display, at the first end, of a first graphical element that represents a first object comprising a plurality of data items;
- display, at the second end, of a second graphical element that represents a second object comprising a plurality of data items;
- wherein the first segment and the second segment represent a relationship between the first object and the second object; and
- wherein the input moves the second graphical element from the second position to the third position.

* * * * *